March 8, 1966 W. O. HARNISH 3,239,058

CARTRIDGE REEL LOCKING CLIP

Filed July 5, 1963

INVENTOR.
WAYNE O. HARNISH
BY
Carpenter, Abbott, Coulter & Kinney
ATTORNEYS 3,239,058
Patented Mar. 8, 1966

3,239,058

CARTRIDGE REEL LOCKING CLIP

Wayne O. Harnish, St. Paul, Minn., assignor to Minnesota Mining and Manufacturing Company, St. Paul, Minn., a corporation of Delaware Filed July 5, 1963, Ser. No. 293,586
6 Claims. (Cl. 206—53)

This invention is especially concerned with magnetic recording tape cartridges in which a flanged reel is rotatively supported in a shallow box-like container. In particular, the invention provides a device for so holding the reel that the cartridge may be mailed or otherwise roughly handled without injury to the tape.

Shipment and handling of magnetic recording tape cartridges often causes the tape on the reel to become loose or angled. Attempts previously made to solve this problem with various devices for holding the reel and tape against movement have not been fully satisfactory. For example, in cartridges sent through the mails the tape has become loose and tangled, even with wedges inserted through the cartridge openings between the reel flanges and cartridge walls. Springs built into the cartridge and frictionally engaging the outer winding of tape have also proved inadequate.

This invention provides a simple, durable, inexpensive clip which holds the reel tightly against rotation and has demonstrated an ability to keep the tape from tangling in spite of the most rigorous conditions of shipment. For a specific cartridge having a relatively large opening in the edge wall for purposes of engaging and driving the reel, an embodiment of the clip is formed with a configuration that closes the opening. In this particular embodiment, the novel clip has the added special feature of preventing the cartridge from being placed in the tape recorder until the clip is removed.

In general, the reel locking clip of this invention is used with a cartridge comprising a shallow box-like container that encloses and rotatively supports a reel having a hub and two parallel, circular side flanges. The container has side walls spaced from the exterior flange surfaces and edge walls spaced from the flange peripheries and is formed with an edge opening exposing the peripheries of the reel flanges. The clip is removably inserted through the edge opening and includes two flexible, substantially parallel arms, preferably spaced approximately the axial width of the reel, and connected by a handle portion.

In a specific construction, the end portions of the arms have a tapering configuration adapting them to fit between and, when fully inserted, in contact with radial ribs formed on the exterior reel flange surfaces. Preferably, the tapered end portion of each arm has a concave inner-facing surface with acute or feathered edges and the overall thickness of each end portion slightly exceeds the spacing between the flange surface and the adjacent side wall of the container. These feathered edges form contact surfaces that resiliently grip the reel flanges, especially under the pressure resulting from the compression of the tapered end portions in the confined space between the flange suface and the container side wall. When the clip is fully inserted, a portion of the handle abuts the margin of the container edge opening to insure against rotation of the reel.

The present invention will be readily understood from the following description of a preferred embodiment in conjunction with the accompanying drawings in which.

Figure 1:
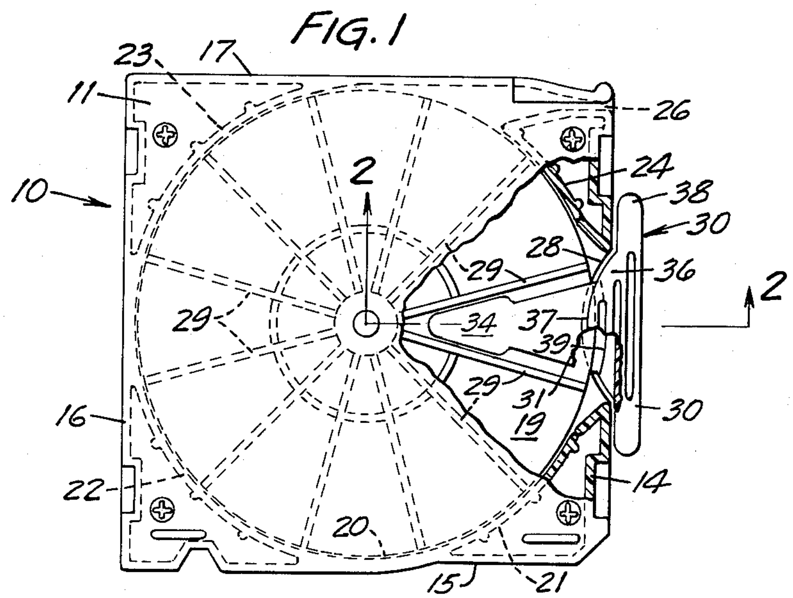
FIGURE 1 is a top view of a transparent cartridge with the top side wall partially broken away and with a reel locking clip partially inserted.
Figure 2:
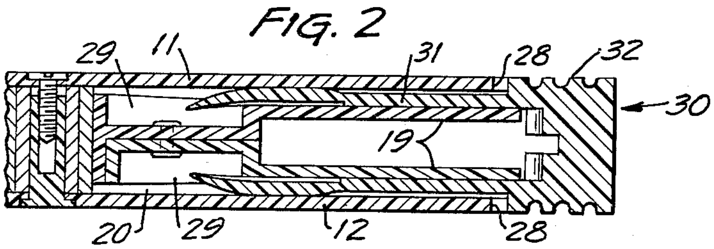
FIGURE 2 is a section along the line 2—2 of FIGURE 1.
Figure 3:
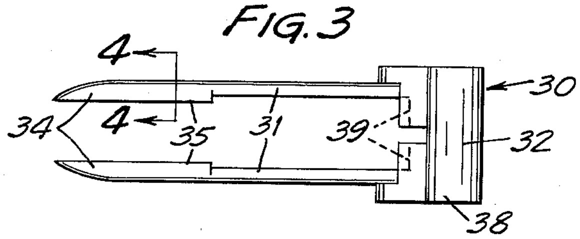
FIGURE 3 is a side elevation of the reel locking clip illustrated in FIGURE 1.

The single reel cartridge in FIGURE 1 is a shallow, box-like plastic container 10 with side walls 11 and 12 and edge walls 14, 15, 16 and 17. A flanged reel 19 is rotatively supported in the cartridge inside a cylindrical cavity 20 defined by portions of the edge walls 15, 16 and 17 and interior arcuate walls 21, 22, 23 and 24. The container 10 has two openings—a tape slot 26 through which tape wound on the reel may be fed to the recording-reproducing apparatus, and an edge opening 28 exposing the flange peripheries of the reel 19 for engagement with drive means of the apparatus. The reel 19 is formed with a plurality of radially extending ribs 29 slightly raised above the otherwise flat outer flange surfaces.

Figure 4:
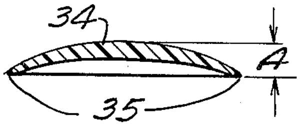
FIGURE 4 is a section along the line 4—4 of FIGURE 3.

The reel locking clip 30 includes two flexible elastic, substantially parallel arms 31 and a connecting handle portion 32, and is preferably molded from a resilient plastic, such as polypropylene, having propertlies like hard rubber. The arms 31 are preferably spaced slightly more than the exterior width of the reel not including the ribs 29, though a slight frictional fit on the reel might also be desirable. Tapered end portions 34 of the arms fit between adjacent reel flange ribs 29, and each has a concave inner-facing surface and a convex outer-facing surface that form around the tapered end an acute, feathered edge 35 adapted to resiliently contact the reel. Over most of their length, the arms 31 are thinner than the spacing between the flat outer flange surface and the adjacent side wall of the container 10, except that each end portion 34 has an overall thickness A (see FIGURE 4) slightly greater than said spacing. When the end portion 34 is inserted in the cartridge, its convex outer-facing surface contacts the container side wall along the longitudinal center of the convex surface. The contact pressure forces the end portion 34 down, flexing the feathered edges 35 against the reel flange surface and into firm abutment against the base of the radially extending ribs 29. With the edge 35 against the base of the rib, any tendency for the ribs to cam underneath the arm is substantially eliminated.

The handle 32 of the clip 30 includes a central section 36 which is formed with a curved portion 39 that conforms to the periphery of the reel flanges when the clip 30 is fully inserted in the cartridge through the edge opening 28. The curved side 37 of the central section 36 and shoulders 38 at the sides of central section 36 also conform to the edge opening 28 when the clip is inserted to substantially close the opening 28. A tough plastic envelope (not illustrated) may be vacuum formed around the entire cartridge and protruding handle portion of the inserted clip to assure, during shipment, the retention of the clip in the cartridge.

I claim:

1. In combination, a reel having a hub and two parallel circular side flanges, a shallow box-like container enclosing and rotatively supporting the reel, the container having side walls spaced from the exterior flange surfaces and edge walls spaced from the flange peripheries, and the container being formed with an edge opening exposing the peripheries of the reel flanges, and a clip removably inserted through said edge opening for locking the reel against rotation, the clip including two flexible substantially parallel arms spaced approximately the axial width of the reel, and a connecting portion, one arm being compressed in the space between each flange surface and adjacent side wall, the connecting portion having an extension which abuts the margin of said edge opening when the clip is fully inserted.

2. In combination, a reel having a hub and two parallel circular side flanges with substantially flat outer surfaces, a shallow box-like container enclosing and rotatively supporting the reel, the container having side walls spaced from the outer flange surfaces and edge walls spaced from the flange peripheries, and the container being formed with an edge opening exposing the peripheries of the reel flanges, and a clip removably inserted through said edge opening for locking the reel against rotation, the clip including two flexible resilient substantially parallel arms and a connecting handle portion, one arm being inserted in the space between each flange surface and adjacent side wall, a portion of each arm having a concave inner-facing surface with acute feathered edges at its sides gripping the flange surfaces, and the clip having an extension which abuts the margin of said edge opening when the clip is fully inserted.

3. In combination, a reel having a hub and two parallel circular side flanges with substantially flat outer surfaces, a shallow box-like container enclosing and rotatively supporting the reel, the container having side walls spaced from the outer flange surfaces and edge walls spaced from the flange peripheries, and the container being formed with an edge opening exposing the peripheries of the reel flanges, and a clip removably inserted through said edge opening for locking the reel against rotation, the clip including two flexible resilient substantially parallel arms and a connecting handle portion, one arm being inserted in the space between each flange surface and adjacent side wall, a portion of each arm having a concave inner-facing surface with acute feathered edges at its sides, said portion having a thickness in the direction of the reel axis greater than the distance between the flat outer flange surface and adjacent container side wall, and the clip having an extension which abuts the margin of said edge opening when the clip is fully inserted.

4. In combination, a reel having a hub and two parallel circular solid side flanges with substantially flat outer surfaces and thin narrow radial ribs formed on the outer surfaces, a shallow box-like container enclosing and rotaatively supporting the reel, the container having side walls spaced from the exterior flange surfaces and edge walls spaced from the flange peripheries, and the container being formed with an edge opening exposing the peripheries of the reel flanges, and a clip removably inserted through said edge opening for locking the reel against rotation, the clip including two flexible substantially parallel arms and a connecting handle portion, one arm being inserted in the space between each flange surface and adjacent side wall, each arm fitting in the space defined by adjacent ribs with at least portions of the arm's edges against the ribs to hinder relative movement between the reel and clip, the clip having an extension which abuts the margin of said edge opening when the clip is fully inserted.

5. In combination, a reel having a hub and two parallel circular solid side flanges with substantially flat outer surfaces and thin narrow radial ribs formed on the outer surfaces, a shallow box-like container enclosing and rotatively supporting the reel, the container having side walls spaced from the exterior flange surfaces and edge walls spaced from the flange peripheries, and the container being formed with an edge opening exposing the peripheries of the reel flanges, and a clip removably inserted through said edge opening for locking the reel against rotation, the clip including two flexible substantially parallel arms and a connecting handle portion, one arm being inserted in the space between each flange surface and adjacent side wall, each arm having a tapered end portion adapted to fit in the space defined by adjacent ribs, said tapered portion having a concave inner-facing surface with its tapered sides comprising acute feathered edges adapted to lie against the ribs to hinder relative movement between the reel and clip, the clip having an extension which abuts the margin of said edge opening when the clip is fully inserted.

6. In combination, a reel having a hub and two parallel circular side flanges, a shallow box-like container enclosing and rotatively supporting the reel, the container having side walls spaced from the exterior flange surfaces and edge walls spaced from the flange peripheries, and the container being formed with an edge opening exposing the peripheries of the reel flanges, and a clip removably inserted through said edge opening for locking the reel against rotation, the clip including two flexible substantially parallel arms spaced approximately the axial width of the reel, one arm being inserted in the space between each flange surface and adjacent side wall with at least portions of the arms gripping the flange surfaces, and a handle portion connecting the arms and having a surface adjacent its juncture with the arms that mates with the whole margin of the edge opening to close the edge opening when the clip is fully inserted.

References Cited by the Examiner

UNITED STATES PATENTS

| | | | |
|---|---|---|---|
| 574,476 | 1/1897 | Coy | 81—43 X |
| 664,885 | 1/1901 | McGrath. | |
| 914,449 | 3/1909 | O'Brien | 206—55 |
| 966,325 | 8/1910 | Gilbert. | |
| 1,117,740 | 11/1914 | Witt | 81—43 |
| 1,317,035 | 9/1919 | Proudfit. | |
| 1,499,910 | 7/1924 | Cox | 206—55 |
| 2,943,521 | 7/1960 | Betton | 81—43 |
| 3,140,715 | 7/1964 | Whitton | 81—43 |

LOUIS G. MANCENE, *Primary Examiner.*

THERON E. CONDON, *Examiner.*